3 Sheets--Sheet 2.

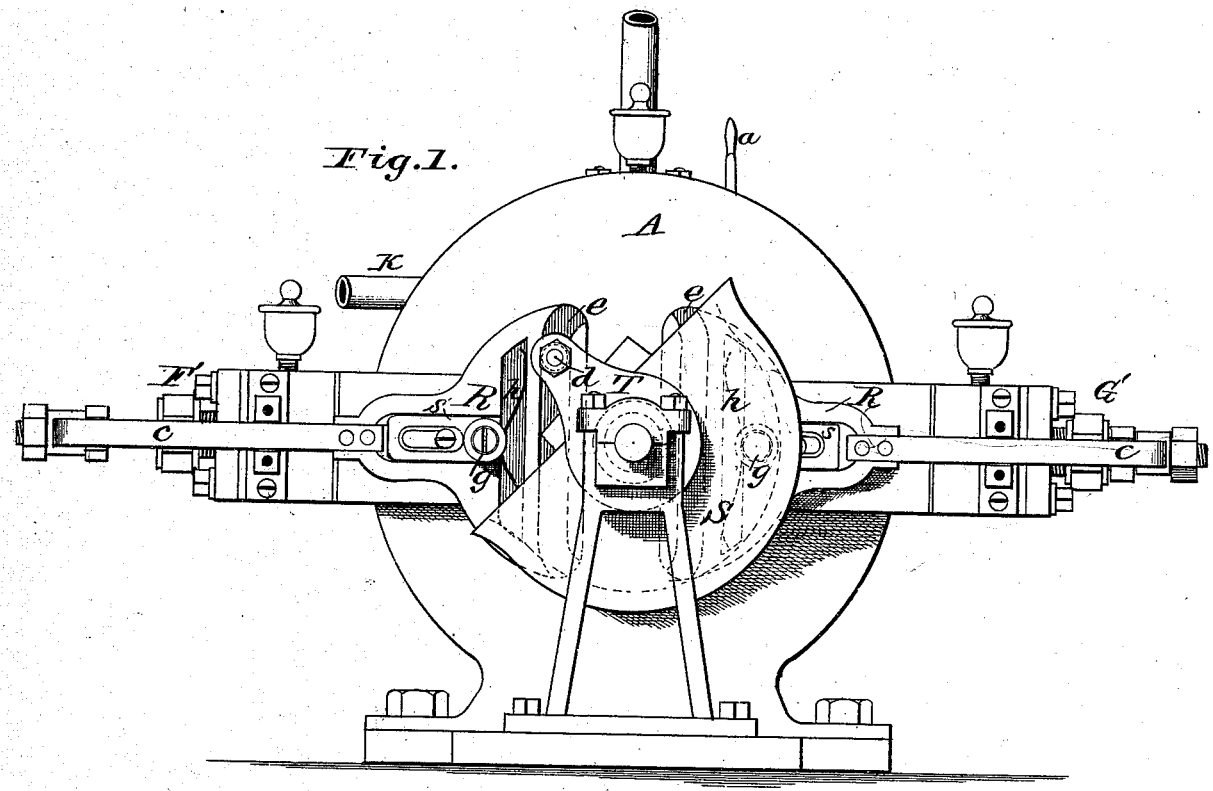
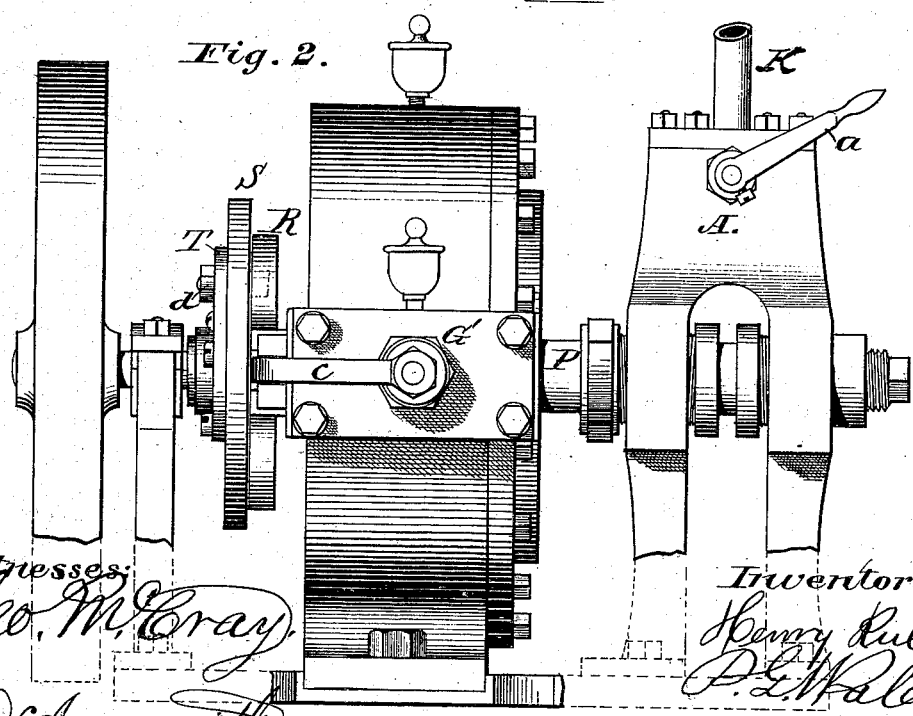

H. REILY & P. G. WALDO.
Rotary Engine.

No. 168,184. Patented Sept. 28, 1875.

Witnesses:
Geo. M. Cray
E. D. Arrowsmith

Inventors:
Henry Reily
P. G. Waldo

N. PETERS, PHOTO-LITHOGRAPHER, WASHINGTON, D. C.

H. REILY & P. G. WALDO.
Rotary Engine.

No. 168,184.  Patented Sept. 28, 1875.

3 Sheets--Sheet 3.

Witnesses:
Geo. M. Cray.
E. D. Arrowsmith.

Inventors.
Henry Reily
P. G. Waldo

UNITED STATES PATENT OFFICE.

HENRY REILY, OF PETROLIA, AND PHAREZ G. WALDO, OF TIDIOUTE, PENNSYLVANIA.

IMPROVEMENT IN ROTARY ENGINES.

Specification forming part of Letters Patent No. 168,184, dated September 28, 1875; application filed August 8, 1874.

*To all whom it may concern:*

Be it known that we, HENRY REILY, of Petrolia, Butler county, and P. G. WALDO, of Tidioute, Warren county, both in the State of Pennsylvania, have invented certain new and useful Improvements in Rotary Engines; and we do hereby declare the following to be a full, clear, and exact description thereof, reference being had to the accompanying drawing, and to the letters of reference marked thereon.

The nature of our invention consists in the construction and arrangement of a rotary engine, as will be hereinafter more fully set forth.

Figure 3:
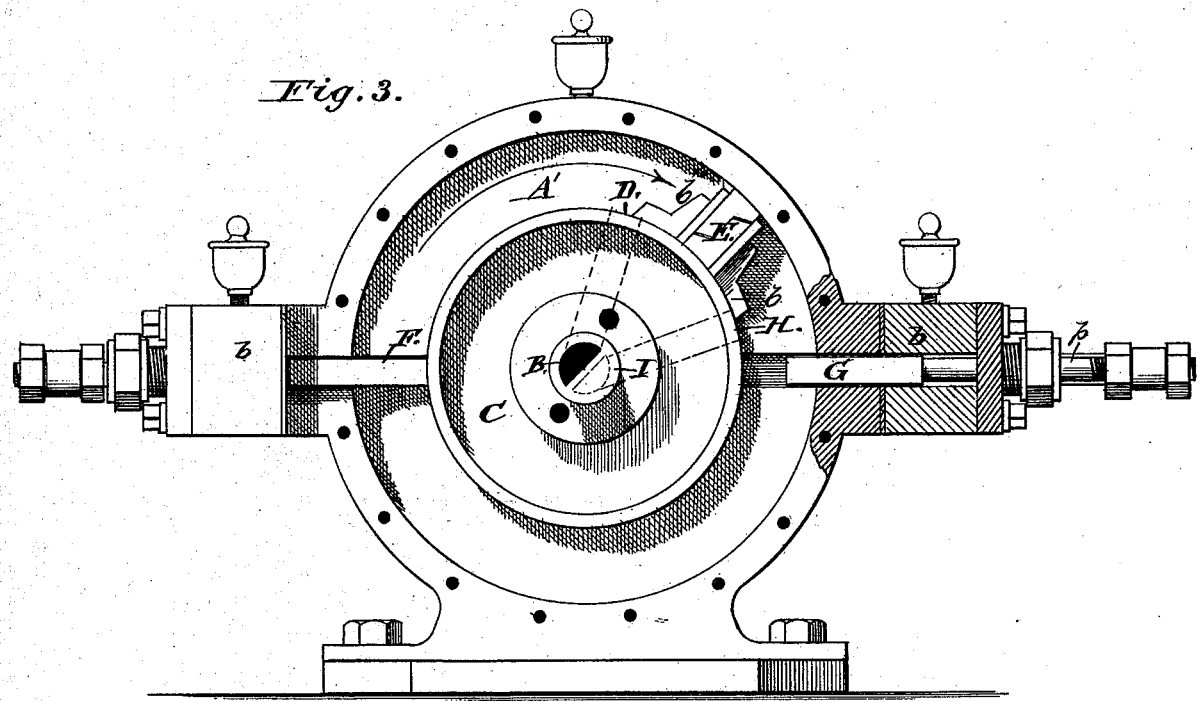
Figure 4:
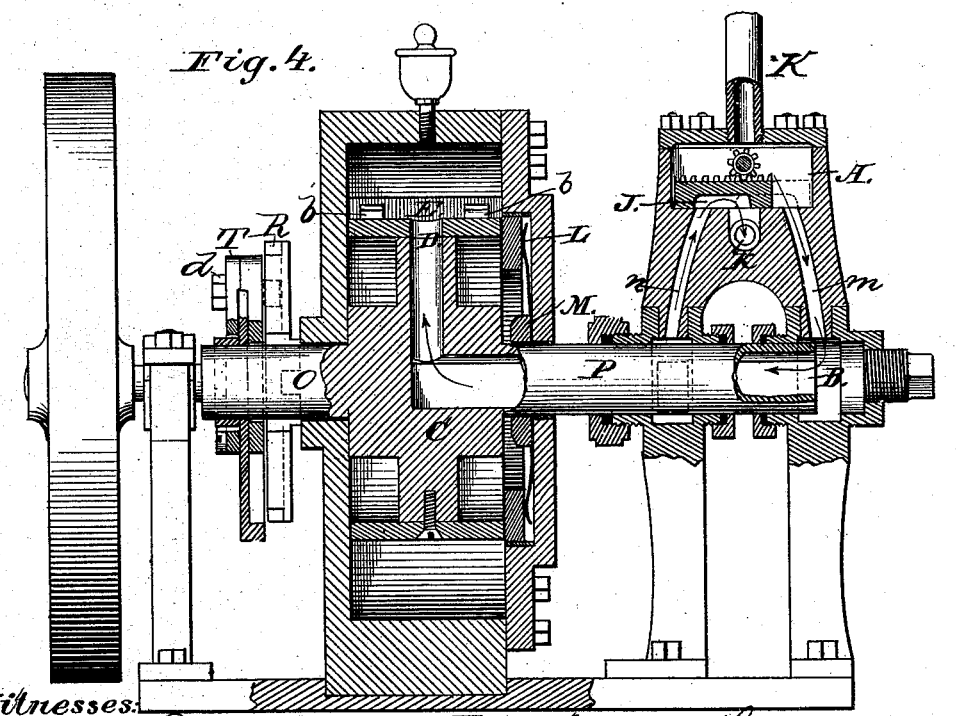
Figure 5:
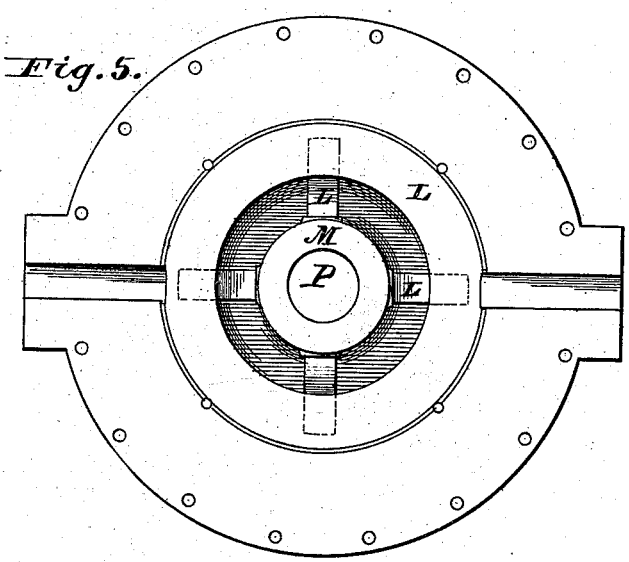
Figure 6:
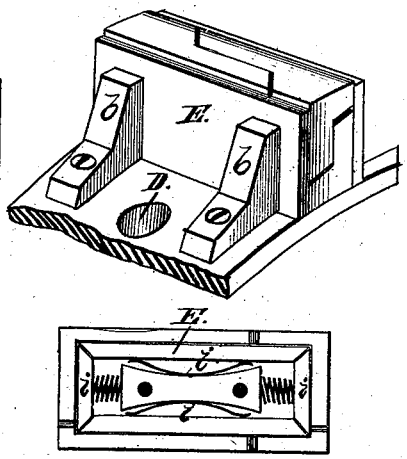
Figure 7:
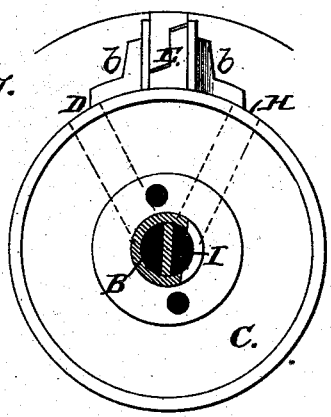
Figure 8:
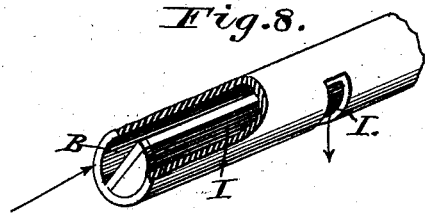

In the accompanying drawing, forming part of this specification, Figure 1 is a side elevation of our rotary engine. Fig. 2 is an end view of the same. Fig. 3 is an interior view of the engine, one of the heads being removed. Fig. 4 is a transverse vertical section of the engine, with a longitudinal vertical section of the steam-chest. Fig. 5 is an inside view of the cylinder-head. Fig. 6 is a perspective view of the driving-head on the revolving wheel. Fig. 7 is a side view of the revolving wheel; and Fig. 8 is a perspective view, partly in section, of the hollow shaft through which the steam enters the engine.

A' represents the cylinder or casing, provided on opposite sides with valve-boxes F' and G', in which are placed, respectively, the sliding valves F and G. Within the cylinder A' is the revolving wheel or drum C, which is hollowed out or provided with annular recesses on each side, as shown in Fig. 4. On the outer periphery of the drum C is placed the driving-head E, which extends out of the inner circumference of the casing, and is held in place by means of brackets b b, fastened on the drum. The driving-head E sits loosely between these brackets, and is made in sections overlapping each other, with springs i arranged between them, as shown in Fig. 6, in such a manner that the head can expand in all directions and form steam-tight joints. The drum C is formed with two journals, O and P, the former being solid and revolving in suitable bearings, while the latter is hollow and divided by a longitudinal partition into two semicircular tubes or channels, which communicate, respectively, with the two passages D and H in the drum C, said passages or ports opening one on each side of the driving-head E. A represents the steam-chest, provided with a slide-valve, J, constructed as shown in Fig. 4, to open and close either of the two passages m and n. The valve is moved by means of a lever, a, on the outside of the steam-chest, connected with pinion and rack-bar, as shown. The passages m n lead to the bearings in which the hollow shaft P is placed. The steam is conducted from the boiler to the steam-chest, and passes through the port m to the end of the double hollow shaft P, entering at B; then passes through into the revolving drum C, through the port D into the cylinder A, striking the driving-head E and valve F, driving the drum around until the driving-head has passed the valve G, when this valve immediately closes, (or moves inward,) acting as the fulcrum in place of the valve F. The valve F immediately opens or moves outward, allowing the steam to escape into the port H through the drum and hollow shaft, passing out of the port I and passage n under the valve J to and out of the exhaust K. By moving the valve J to the other side of the steam-chest the course of the steam is then reversed, thereby reversing the motion of the engine. The drum C is kept tight by means of a ring, L, of Babbitt metal placed in the cylinder-head, and pressed against the drum by means of one or more springs, M, the ring L being kept from revolving with the drum by means of pins fixed in the cylinder-head, upon which the ring sits, thus holding it in its place. Each of the valves F and G has a rod, p, extending outward in the line of the motion of the valve, to the outer end of which rod is secured an L-shaped arm, c. These arms pass along the outside of one of the cylinder-heads in suitable guides attached thereto, and each arm c has upon its end a plate, R, in which is formed a vertical groove, e, and back of said groove is a roller, g, attached to a slide, s, which is forced outward by means of a spring, h. On the journal O of the drum C is secured a disk, S, of a little more than a half-circle, which disk is flanged on the inner side along the circumference. T is an arm extending midway between the ends of the semicircular disk S, said arm having a revolving wrist, $d$, at its outer end. At every half-revolution of the drum the wrist $d$ enters one of the grooves $e$, and forces that plate R outward, so as to open the valve connected therewith. As the arm continues to revolve it closes the same valve again by drawing its plate inward, and the flanged disk S then commences to ride over the roller $g$ in said plate, so as to hold the valve close down on the drum. By these means the valves F and G are opened and closed at the proper moments.

Having thus fully described our invention, what we claim as new, and desire to secure by Letters Patent, is—

The combination, with the valves F G, of the arms C C, plates R R, with grooves $e$, sliding rollers $g$, and springs $h$, the flanged disk S, and arm T, with revolving wrist $d$, all substantially as and for the purposes herein set forth.

HENRY REILY.
           P. G. WALDO.

Witnesses to signature of P. G. WALDO:
    GEO. MCCRAY,
    J. A. FORD.

Witnesses to signature of HEN. REILY:
    E. D. ARROWSMITH,
    JOHN BRISCOE.